United States Patent [19]

Miyawaki et al.

[11] Patent Number: 5,697,384
[45] Date of Patent: Dec. 16, 1997

[54] INTERNAL IDENTIFICATION APPARATUS FOR ANIMALS

[75] Inventors: Yutaka Miyawaki, Tokyo; Katsuhiko Sasaki, Maebashi, both of Japan

[73] Assignee: Surge Miyawaki Co., Ltd., Tokyo, Japan

[21] Appl. No.: 347,317

[22] PCT Filed: Mar. 25, 1994

[86] PCT No.: PCT/JP94/00488

§ 371 Date: Jan. 26, 1995

§ 102(e) Date: Jan. 26, 1995

[87] PCT Pub. No.: WO94/22295

PCT Pub. Date: Oct. 13, 1994

[30] Foreign Application Priority Data

Mar. 26, 1993 [JP] Japan .................................. 5-68677

[51] Int. Cl.$^6$ .................................................. A61B 19/00
[52] U.S. Cl. ........................... 128/899; 128/631; 128/903
[58] Field of Search ................................. 128/899, 631, 128/642, 718, 903

[56] References Cited

U.S. PATENT DOCUMENTS 4,262,632  4/1981  Hanton et al. ................... 128/631 X

FOREIGN PATENT DOCUMENTS

| 9305648 | 4/1993 | Ireland. |
|---|---|---|
| 60-22428 | 11/1985 | Japan. |
| 63-005287 | 1/1988 | Japan. |
| 63-5287 | 1/1988 | Japan. |
| 64-30526 | 2/1989 | Japan. |
| 2-156835 | 6/1990 | Japan. |
| 484838 | 3/1992 | Japan. |
| 2165723 | 4/1986 | United Kingdom. |
| 2175186 | 11/1986 | United Kingdom. |

*Primary Examiner*—Jennifer Bahr
*Assistant Examiner*—Ryan Carter
*Attorney, Agent, or Firm*—Paul & Paul

[57] ABSTRACT

An internal identification apparatus for animals surely stays in a ruminant without injuring the ruminant. After the ruminant is slaughtered, the apparatus is easily located and collected. The apparatus stays in the first or second stomach of the ruminant. The apparatus has a casing (1) made from material that is resistive to gastric juices in the first or second stomach. The casing (1) has a proper weight and shape so that it stays in the first or second stomach. An antenna (2) is formed internally or externally on the casing (1). The casing (1) incorporates an integrated circuit (3), which includes a memory and a controller for transmitting data stored in the memory through the antenna (2) in response to electromagnetic waves from outside the ruminant. The apparatus enables individual farms to automatically feed cattle and record the data such as weights of cattle, and a cattle market to secure cattle prices and record the quality of meat.

11 Claims, 13 Drawing Sheets

INTERNAL IDENTIFICATION APPARATUS FOR ANIMALS

TECHNICAL FIELD

The present invention relates to an internal identification apparatus for animals, and particularly, to an internal identification apparatus to be swallowed by a ruminant and that stays in the first or second stomach of the ruminant. The apparatus may be embedded in a subcutaneous part of an animal. Data related to the animal is read out of the apparatus by an external apparatus, to identify the animal.

BACKGROUND ART

Various identification apparatuses and methods for animals have been proposed for the livestock industry, to manage the shipment, ownership, and individual conditions of livestock such as cattle, hogs, and sheep. Most generally used identification devices are tags printed with numbers and marks. The tags are fixed to the ears, legs, ankles, or tails of animals. The tags are convenient for limited use for farms because they are easy to handle.

The tags, however, are not suitable to nationally or regionally control and breed livestock because they must bear large-digit numbers and because they are unreliable when they are replaced with others. Instead of the tags, black and white patterns for Holsteins or nose patterns for Japanese black cattle are frequently used.

Identifying individual livestock was originally to clarify their ownership. The identification is required nowadays to improve and evaluate individual livestock. Livestock must be individually identified for registration and deals. Stock raisers must identify individual livestock to breed and manage them.

An identification apparatus for animals is required to correctly identify each livestock and provide unchanging, unique, objective, easy-to-judge data. The apparatus must be easily attached to livestock and must be safe for livestock and their products.

A rapid development in electronic technology has realized a very small electronic apparatus for an identification system for livestock. The system transfers data in a noncontact manner with magnetism, radio waves, or light. The system is interlinked with a computer to utilize the data for various purposes.

The system includes a transponder, an antenna, and a reader. The reader is connected to a host computer, which uses data read out of the transponder for various purposes. For example, for a stock raiser, the data are used for automatically feeding livestock and recording the weight of individual livestock. For a livestock market, the data are used for securing livestock prices and evaluating the quality of meat of slaughtered livestock.

The transponder employs a small capsule that contains an integrated circuit and an antenna. The transponder is activated in response to electromagnetic waves from the reader and transmits stored ID codes on radio waves. The reader receives the radio waves, decodes the ID codes, and records the decoded data.

The transponder was originally about 10×5×3 cm in size and was fitted to the neck of an animal. Presently, it is a small hermetically-sealed glass capsule of about 1 to 3.6 cm in length and 1.5 to 4 mm in diameter. The capsule is embedded in a part of an animal, such as an ear or a tail. The animal walks in front of the reader, and the reader reads ID codes stored in the transponder.

The conventional identification system employing the transponder to be embedded in an animal has the following problems in practical use:

(1) The capsule is embedded in an animal with a thick injector needle, so that it is unsanitary. It takes time and labor to catch an animal and embed the capsule therein.

(2) The capsule may stray in the animal, or the capsule, which is made of glass, may break in the animal.

(3) The position of the transponder is not fixed, so that it takes a long time to locate and collect the transponder from a slaughtered animal.

(4) In the worst case, the transponder may remain in the meat, and thus, end up in food.

(5) When the transponder is embedded close to the head, such as the base of an ear, it may cause a read error because the distance between the transponder and the reader fluctuates.

(6) There is a risk of illegal use. Namely, the embedded transponder may be taken out of the animal and may be illegally embedded in another one.

A first object of the present invention is to provide an internal identification apparatus for animals, in particular, ruminants such as cattle, sheep, goats, and deer. The apparatus is inserted into the first or second stomach of a ruminant and stays there. The apparatus easily, safely, and surely settles in the first or second stomach without injuring the ruminant. The apparatus is easy to read to collect its data and to remove from a slaughtered ruminant.

A second object of the present invention is to provide an internal identification apparatus for animals that prevents an illegal use thereof. Namely, the apparatus will not be illegally extracted out of an animal and inserted into another one.

DISCLOSURE OF THE INVENTION

To achieve these objects, an internal identification apparatus for animals according to a first aspect of the present invention is swallowed by a ruminant such as a cow, sheep, goat, or deer. The swallowed apparatus stays in the first or second stomach of the ruminant. The apparatus is made from material that is resistive to gastric juices in the first or second stomach. The apparatus has a casing whose weight and shape are designed to stay in the first or second stomach once it is swallowed. A transmission antenna is installed inside or outside the casing. The casing contains a memory for storing data and a controller for transmitting the data stored in the memory through the antenna in response to electromagnetic waves from outside the ruminant.

An internal identification apparatus for animals according to a second aspect of the present invention is inserted or embedded in a part of an animal. The apparatus has a casing that contains an antenna, a memory, and a controller for transmitting data stored in the memory through the antenna in response to electromagnetic waves from outside the animal. The apparatus detects an environmental change that will occur when the apparatus is taken out of the animal and records the detected change in the memory.

According to the first aspect of the present invention, the internal identification apparatus swallowed by a ruminant stays in the first or second stomach thereof. The data stored in the memory are transmitted through the antennal in response to electromagnetic waves from outside the ruminant. Namely, data related to the animal are collectable from outside the animal. According to the second aspect of the present invention, the memory records an environmental change that may occur when the apparatus is taken out of the animal and is inserted into another animal or is rewritten on its data. Namely, the second aspect checks for illegal use of the apparatus.

BEST MODE OF CARRYING OUT THE INVENTION

Embodiments according to the present invention will be explained in detail with reference to the accompanying drawings.

Figure 1:
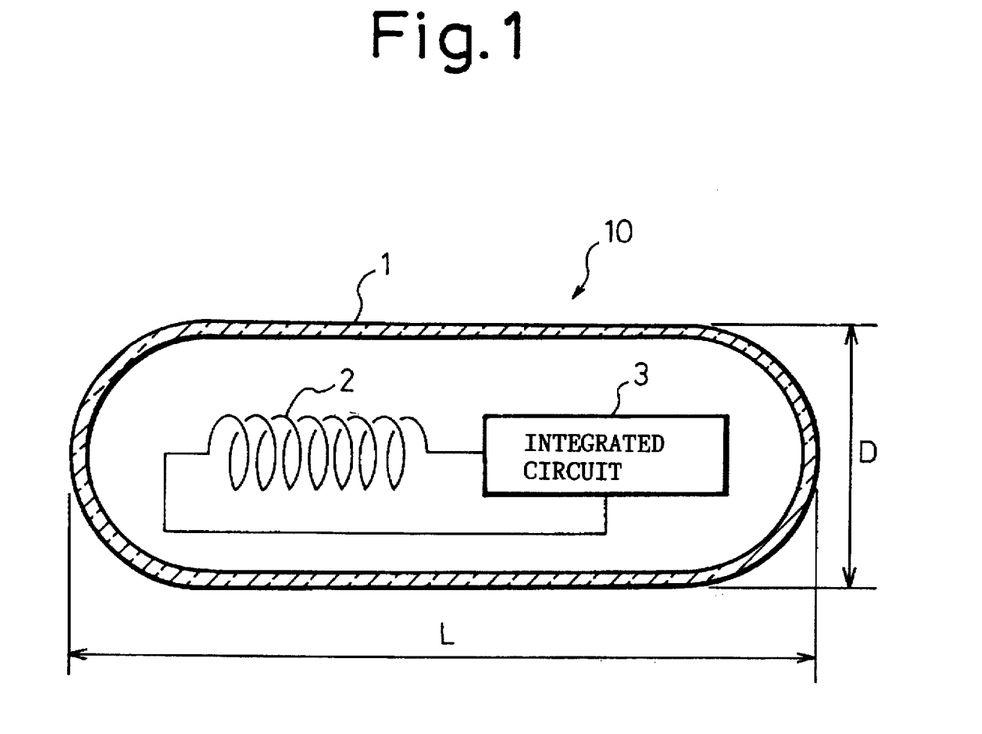
FIG. 1 is a sectional view showing an internal identification apparatus for animals according to a first embodiment of the present invention.

FIG. 1 is a sectional view showing an internal identification apparatus 10 according to the first embodiment of the present invention. The apparatus 10 has a capsule 1. The capsule 1 contains a coil antenna 2 for receiving electromagnetic waves from an external place and generating an electromotive force, and an integrated circuit 3 that is driven by the power induced by the coil antenna 2 and transmits, through the coil antenna 2, identification codes (ID codes) stored therein. The apparatus 10 has no power source. The coil antenna 2 usually has a ferrite core (not shown) to improve communication efficiency. The integrated circuit 3 is of a CMOS structure to minimize power consumption to control the apparatus.

Figure 2A:
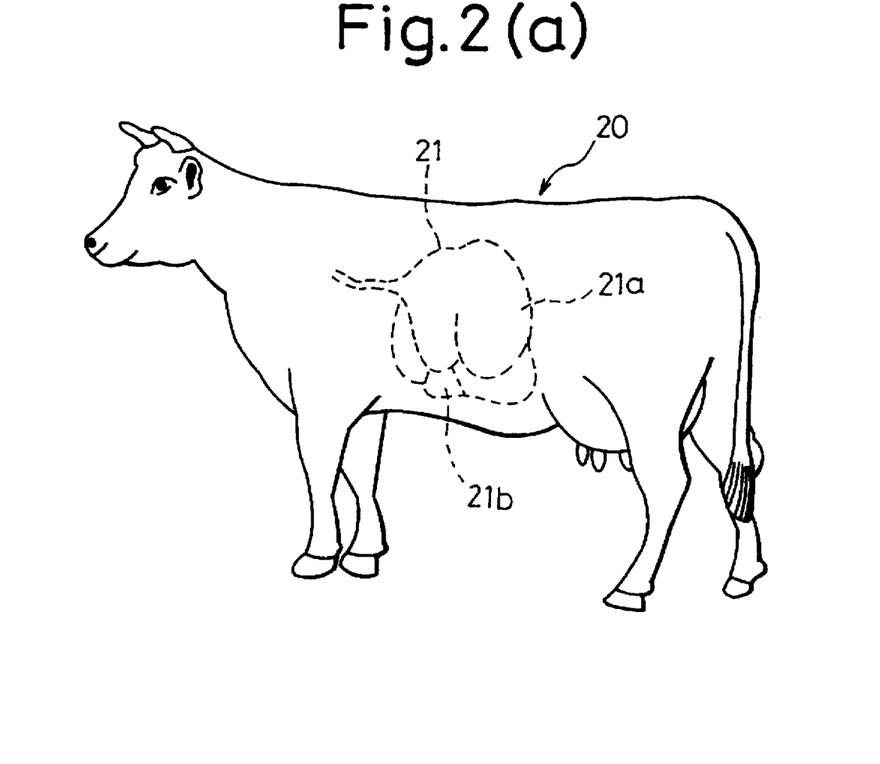
FIG. 2(a) is a side view showing a cow and its stomachs into which the internal identification apparatus of the present invention is inserted.
Figure 2B:
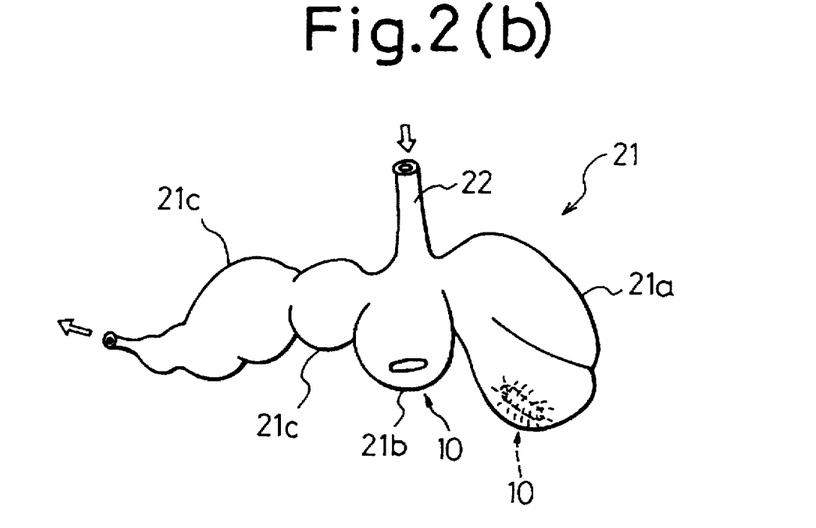
FIG. 2(b) shows the first to fourth ruminant stomachs of a cow.

The apparatus 10 is swallowed by a ruminant such as a cow, sheep, goat, or deer having a ruminant stomach, and stays in the first or second stomach of the animal. FIG. 2(a) is a side view showing a cow 20 as an example of a ruminant. The cow has a ruminant stomach 21 that includes the first stomach 21a and second stomach 21b. FIG. 2(b) shows the ruminant stomach 21 of the cow in detail. The ruminant stomach 21 is composed of the first stomach 21a, second stomach 21b, third stomach 21c, and fourth stomach 21d. The apparatus 10 swallowed by the cow 20 stays in the first stomach 21a as indicated with a dotted line, or in the second stomach 21b as indicated with a continuous line. Numeral 22 is the gullet.

The capsule 1 must be made from material that is resistive to gastric juices in the first stomach 21a or second stomach 21b. The apparatus 10 must have proper size and weight so that it stays in the first stomach 21a or second stomach 21b.

The apparatus 10 is 20 to 60 g in weight and has hairs of 10 to 15 cm in diameter so that the apparatus 10 may stay in the first stomach 21a. The hairs may be made from any material if it is not digested in the first stomach 21a. It is preferable that the hairs are hard like straw. To keep the apparatus in the second stomach 21b, the diameter D of the capsule 1 will be about 10 to 25 mm, and the length L thereof will be about 40 to 150 mm. The weight of the apparatus 10 will be about 50 to 150 g. The shape of the capsule 1 is not particularly limited.

For example, the capsule 1 may have an egg shape or a spherical shape. If it is spherical, the diameter thereof will be about 40 to 60 mm and the weight thereof will be about 40 to 300 g. The greater the specific gravity of the capsule, the better. The capsule 1 may be made from ceramics in terms of specific gravity and electromagnetic waves. To further increase the specific gravity, heavy metal will be arranged along an extension from the ferrite core of the coil two to three centimeters or more away from the coil.

When the apparatus 10 is applied to a sheep or goat, the size of the capsule 1 must be reduced compared with that for a cow and the weight thereof will be about 20 to 80 g.

Figure 3:
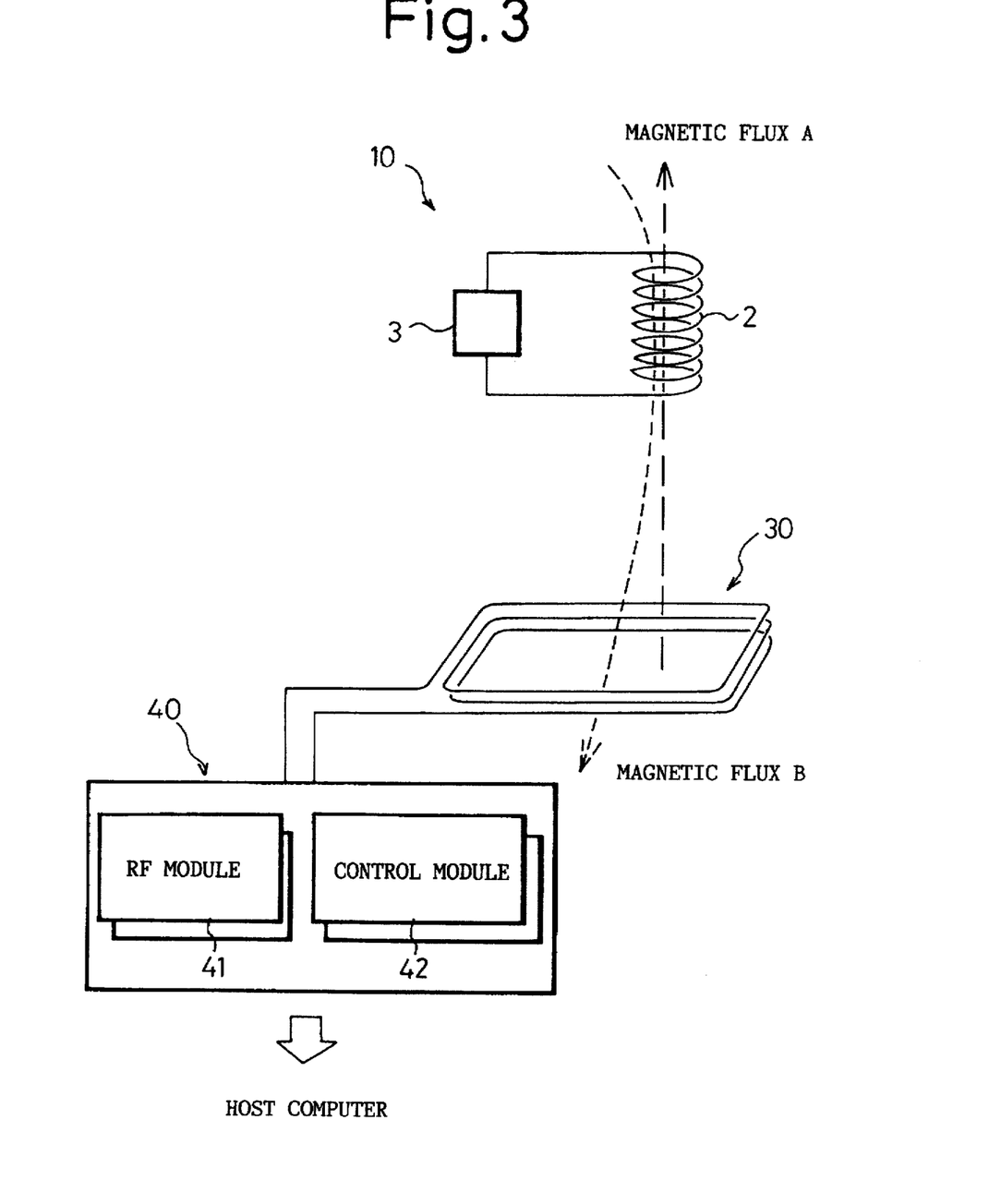
FIG. 3 shows data transmission between the internal identification apparatus of FIG. 1 and a reader.

FIG. 3 shows an antenna 30 and a reader 40 used with the apparatus 10. The antenna 30 of this embodiment employs an air coil made of a wound electric wire. The size of the air coil is properly designed according to a constant magnetic field distribution. The reader 40 is connected to the antenna 30 and includes an RF module 41 and a control module 42. The RF module 41 is an analog section for transmitting and receiving radio waves. The output of the RF module 41 is a binary digital signal, which is supplied to the control module 42. The control module 42 has a microcomputer, which decodes ID codes received from the apparatus 10 through the antenna 30.

The control module 42 has an interface to communicate with a host computer that analyzes and accumulates data received from the apparatus 10.

Communication procedures between the apparatus 10 and the reader 40 will be explained next.

(1) The reader 40 emits electromagnetic waves from the antenna 30 toward the apparatus 10.

(2) The electromagnetic waves produce magnetic flux A in the antenna coil 2 of the apparatus 10, to generate power to activate the integrated circuit 3.

(3) ID codes stored in the integrated circuit 3 are transmitted on radio waves from the antenna coil 2.

(4) The radio waves from the apparatus 10 are received by the antenna 30, and the reader 40 analyzes the received data and decodes the ID codes.

In this way, the ID codes stored in the apparatus 10 are decoded by the reader 40 in a noncontact manner, to easily manage the cow 20.

Since the apparatus 10 stays in the first stomach 21a or second stomach 21b of the cow 20, the cow 20 will not be injured and the apparatus 10 will be difficult to remove. The apparatus 10 will be easily located and collected after the cow 20 is slaughtered.

The ID codes may include the management number, owner number, date of birth, place of birth, parents numbers, etc., of the cow. The characteristics of the cow such as nose patterns, body patterns, forehead whorls, blood type, etc., will also be digitized and included in the ID codes. The ID codes must not be able to be manipulated once they have been written, and they must be easily collated to check for illegal replacement of the apparatus 10.

Figure 4:
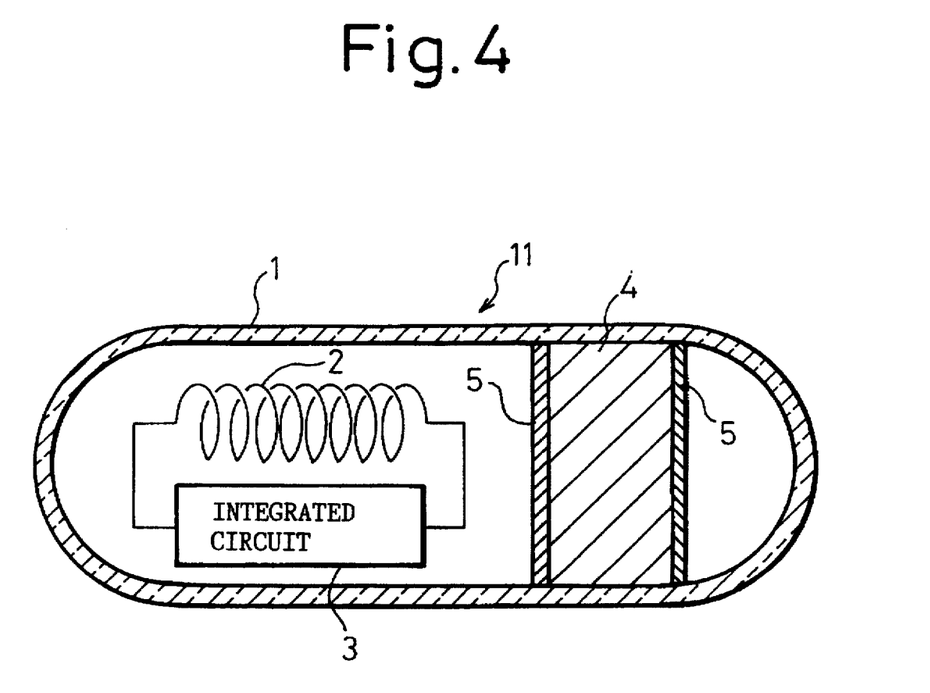
FIG. 4 is a sectional view showing an internal identification apparatus for animals according to a second embodiment of the present invention.

FIG. 4 is a sectional view showing an internal identification apparatus 11 according to the second embodiment of the present invention. The same parts as those of the embodiment of FIG. 1 are represented with like reference marks. The apparatus 11 has a capsule 1 that contains an antenna coil 2, an integrated circuit 3, and a weight 4 held between support plates 5. The weight 4 keeps the apparatus 11 in the second stomach of a ruminant if the capsule 1, coil 2, and integrated circuit 3 are too light. The weight 4 is properly adjusted according to an animal that will swallow the apparatus 11.

Figure 5A:
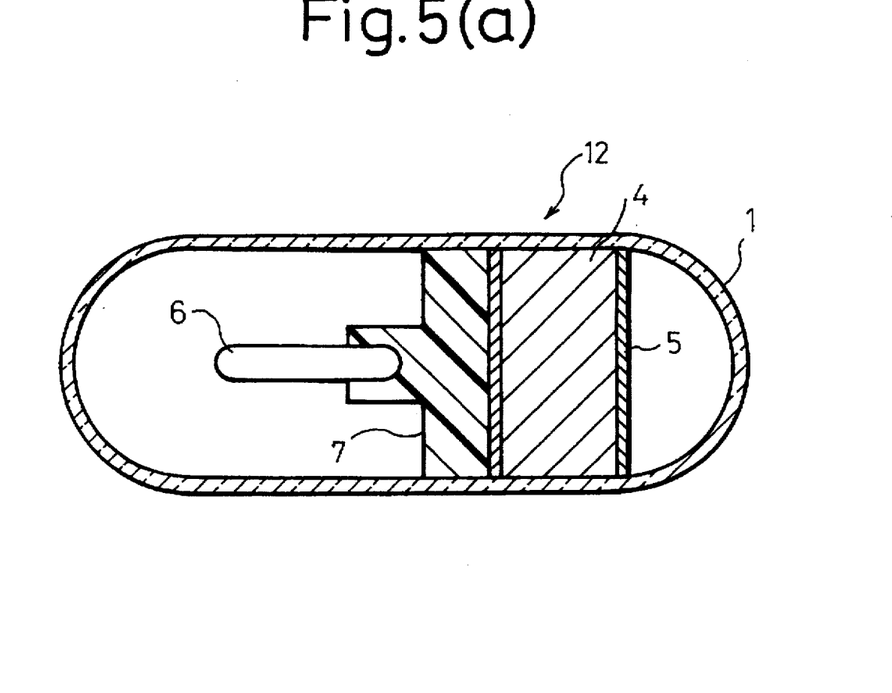
FIG. 5(a) is a sectional view showing an internal identification apparatus for animals according to a third embodiment of the present invention.

FIG. 5(a) is a sectional view showing an internal identification apparatus 12 according to the third embodiment of the present invention. A capsule 1 contains a transponder 6 available commercially and a spacer 7 for holding the transponder 6. Adjacent to the spacer 7, a weight 4 is held between support plates 5. The transponder 6 is surrounded by a space in the capsule 1. This space is used for various purposes. For example, the space is filled with a physical or chemical material that changes its color once it is exposed to light. This easily enables checks for illegal replacement. The space may contain the photograph of a corresponding Holstein.

Figure 5B:
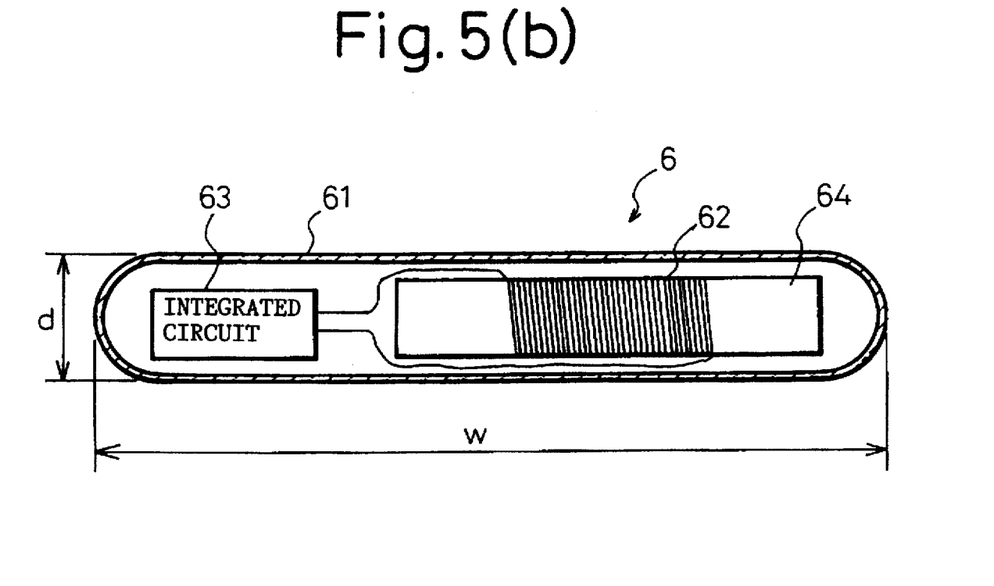
FIG. 5(b) is an enlarged section showing a transponder of FIG. 5(a)

FIG. 5(b) is an enlarged section showing the transponder 6 of FIG. 5(a). The transponder 6 has a sealed glass casing 61 that contains a coil antenna 62 and an integrated circuit 63. The coil antenna 62 generates an electromotive force in response to electromagnetic waves from another place. The integrated circuit 63 stores ID codes. The integrated circuit 63 is activated by the power induced by the coil antenna 62 and transmits the ID codes through the coil antenna 62. The coil antenna 62 has a ferrite core 64 to improve communication efficiency. The function of the transponder 6 is the same as that of the apparatus 10 of FIG. 1. The transponder 6 is available commercially.

Figure 6A:
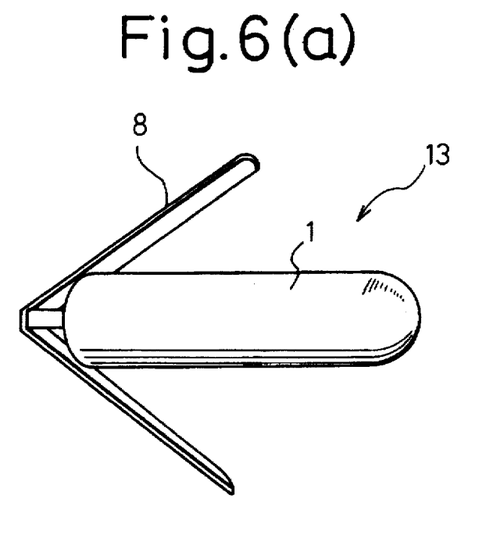
FIG. 6(a) is an outside view showing an internal identification apparatus for animals according to a fourth embodiment of the present invention.
Figure 6B:
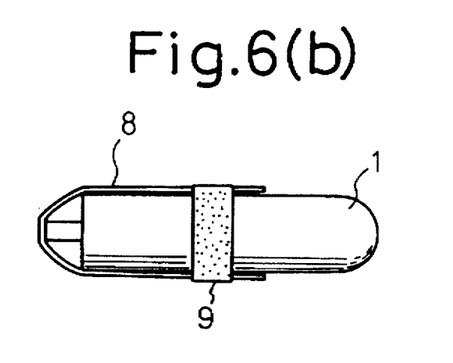
FIG. 6(b) is a side view showing the apparatus of FIG. 6(a) before being applied to an animal.

FIG. 6(a) is an outside view showing an internal identification apparatus 13 according to the fourth embodiment of the present invention, and FIG. 6(b) is a side view showing the apparatus 13 before being applied to an animal. The apparatus 13 has fins 8 that protrude sidewards when the apparatus 13 enters the first or second stomach of a ruminant, to surely keep the apparatus 13 in the stomach. As shown in FIG. 6(b), the fins 8 are closed with a band 9 before the apparatus 13 is applied to an animal. When the band 9 melts in the first or second stomach of a ruminant, the fins 8 protrude sidewards as shown in FIG. 6(a).

Figure 6C:
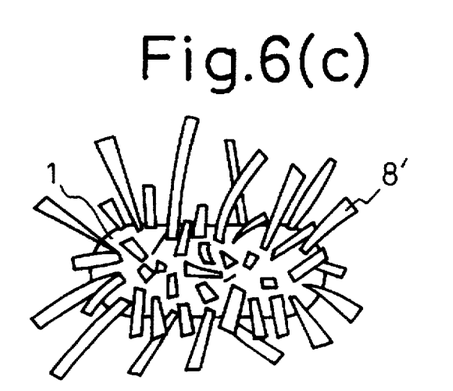
FIG. 6(c) is a side view showing a casing with hairs.

FIG. 6(c) shows an internal identification apparatus 13 according to a modification of the fourth embodiment. The apparatus 13 has a casing 1 that has many brush-like projections 8' instead of the fins 8. The projections 8' are hard like straw.

Figure 7:
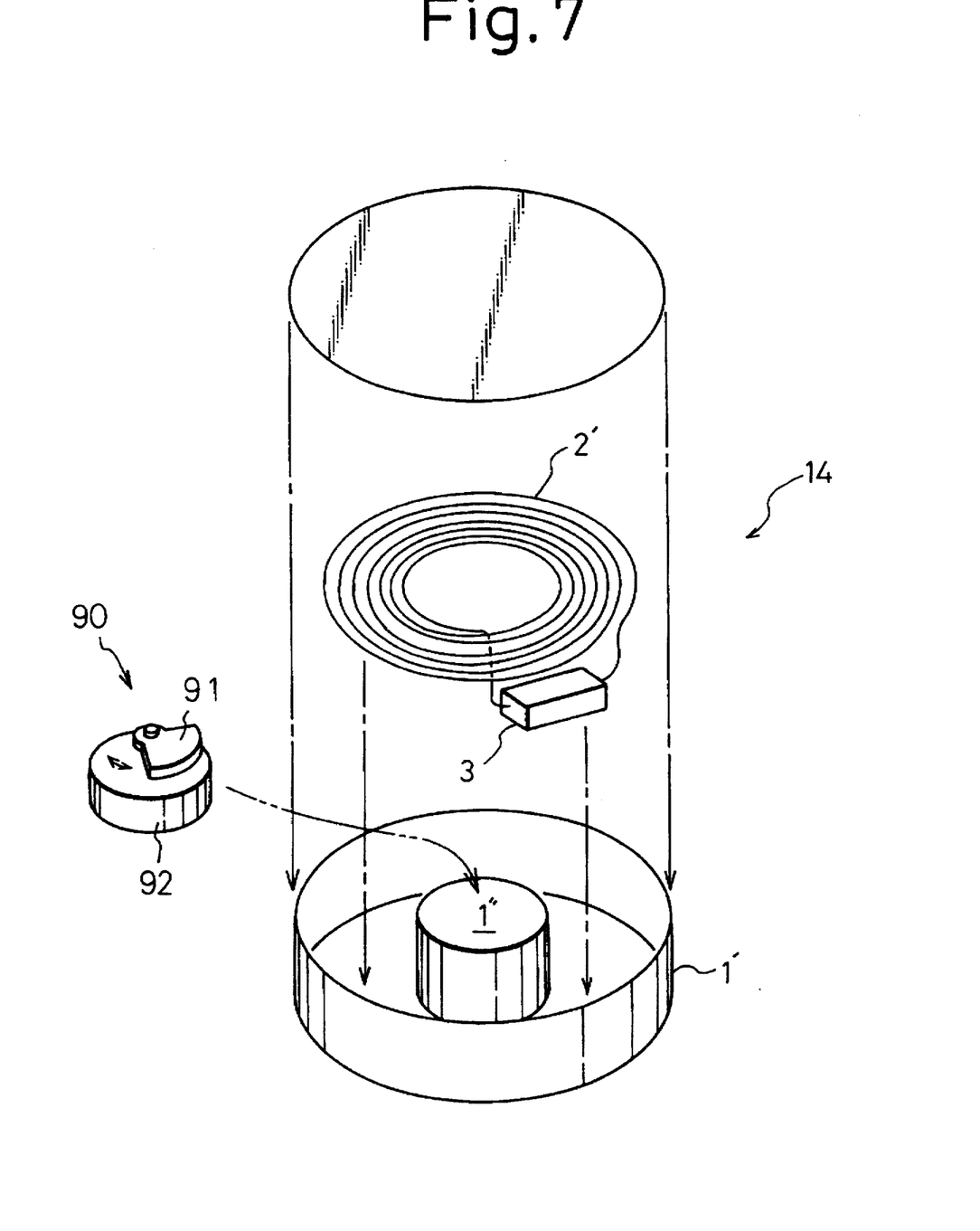
FIG. 7 is an exploded view showing an internal identification apparatus for animals according to a fifth embodiment of the present invention.

FIG. 7 is an exploded perspective view showing an internal identification apparatus 14 according to the fifth embodiment of the present invention. This embodiment employs an annular casing 1' instead of a capsule. An antennal coil 2' is helically wound, and each end thereof is connected to an integrated circuit 3. The antenna coil 2' is inserted into an annular space in the casing 1'. A center space 1" of the casing 1' receives an iron core, or a generator unit 90 having a pendulum 91 and a generator 92.

Figure 8A:
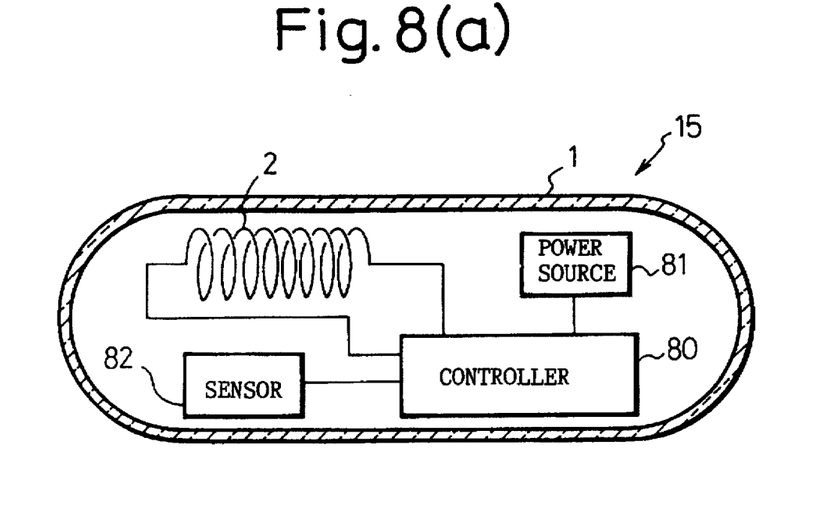
FIG. 8(a) is a sectional view showing an internal identification apparatus for animals according to a sixth embodiment of the present invention.

FIG. 8(a) is a sectional view showing an internal identification apparatus 15 according to the sixth embodiment of the present invention. The apparatus 15 has a capsule 1. The capsule 1 contains a controller 80 having a microcomputer, a power source 81, and a sensor 82. The capsule 1 may contain a coil antenna 2 similar to the previous embodiments.

Figure 8B:
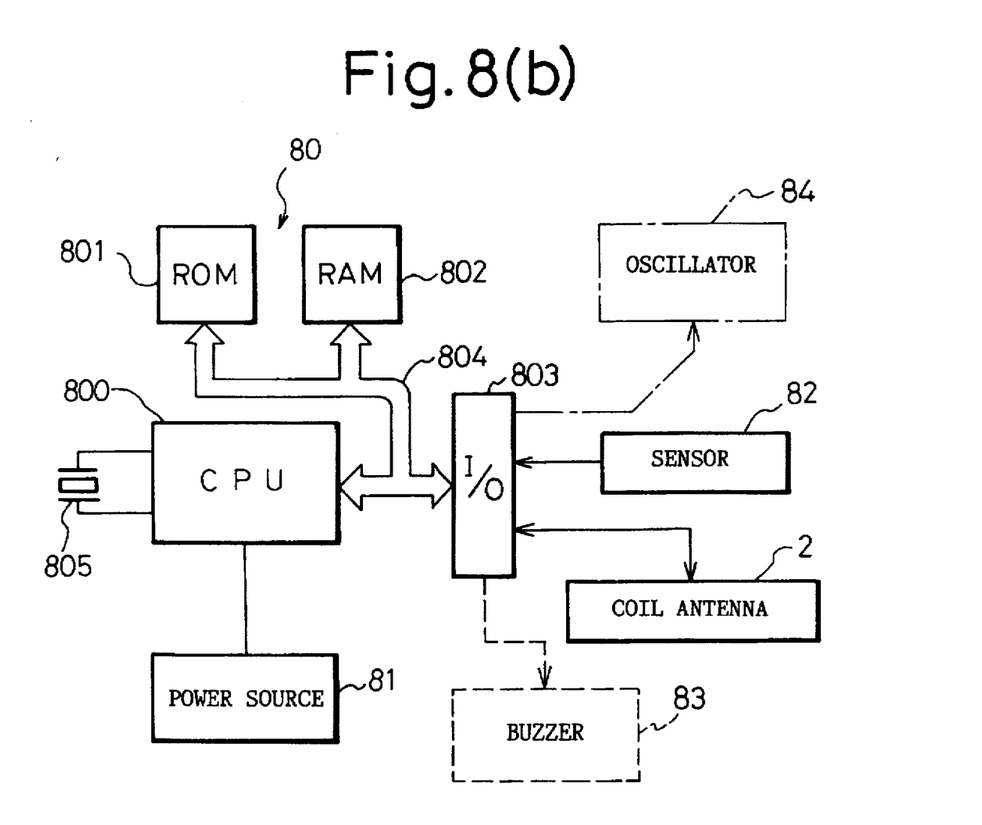
FIG. 8(b) is a block diagram showing the inside of a controller of FIG. 8(a)

FIG. 8(b) shows the controller 80 having a microcomputer. The controller 80 has a CPU 800, a ROM 801, a RAM 802, and an I/O interface 803. These parts are connected to one another through a bus 804. Numeral 805 is a crystal oscillator. The coil 2 and sensor 82 are connected to the controller 80 through the I/O interface 803.

The sensor 82 may be a temperature sensor, a pH sensor, a vibration sensor, or a conductance sensor. The sensor regularly detects conditions in the stomach of a cow and stores the detected conditions in the RAM 802 of the controller 80. If no antenna coil 2 is arranged, the apparatus 15 is collected after the cow is slaughtered and is installed on a reader to read the data related to the fattening state of the cow. If the apparatus 15 is provided with the antenna coil 2, the data stored in the RAM 802 are taken out by a reader in a noncontact manner as follows:

(a) The reader emits radio waves to let the apparatus 15 send the data.

(b) The apparatus 15 informs the reader that the apparatus 15 is ready to transmit the data.

(c) The reader sets itself in a reception enabled state and receives the data from the apparatus 15 through an antenna.

(d) The above procedures are repeated.

In this way, the reader carries out, for example, intermittent communication to properly pick out data from the apparatus 15 in a noncontact manner.

The power source incorporated in the apparatus and the microcomputer incorporated in the controller enable the apparatus to provide more pieces of information related to the growth and health of the animal. The information is useful to breed cattle. The data may be transmitted for a long distance if required.

As indicated with dotted lines in FIG. 8(b), the casing 1 may accommodate a buzzer 83, or as indicated with dot-and-dash lines, an oscillator 84, to call cattle together with use of a conditioned reflex in response to buzzer sound or oscillation.

The power source 81 of FIG. 8 may be a primary battery such as a lithium battery, or a rechargeable secondary battery. The power source 81 may be replaced with one or two capacitors. When the power source 81 is a secondary battery, the capsule 1 may have a generator for charging the secondary battery.

Figure 9:
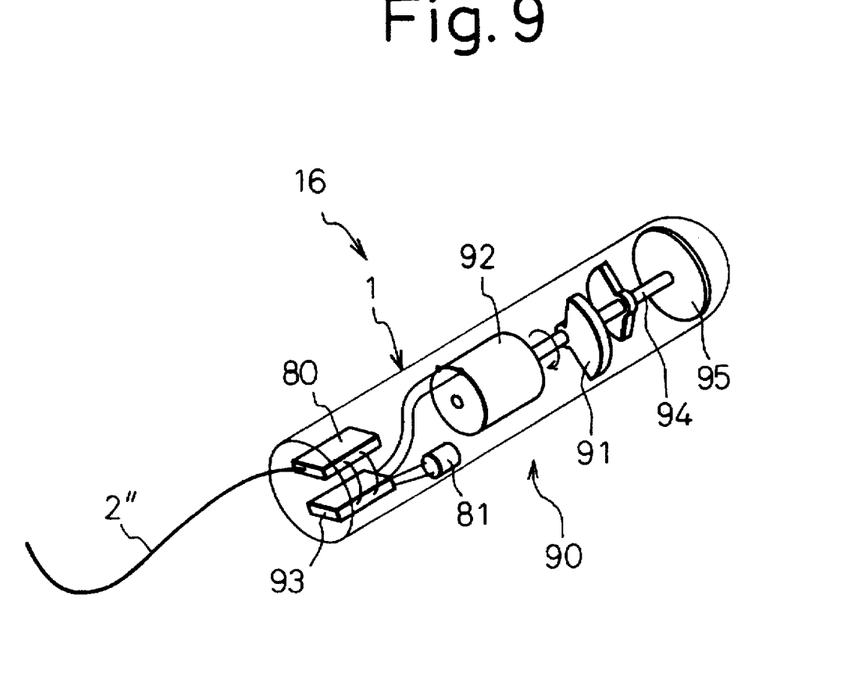
FIG. 9 is a perspective view showing an internal identification apparatus for animals having an internal generator, according to a seventh embodiment of the present invention.

FIG. 9 is a perspective view showing an internal identification apparatus 16 for animals, having a generator unit, according to the seventh embodiment of the present invention. The generator unit 90 is incorporated in a casing 1. The generator unit 90 has pendulums 91, a generator 92, and a charging circuit 93. The pendulums 91 are fixed to a rotary shaft 94 of the generator 92. The rotary shaft 93 is supported by a support plate 95. When the casing 1 moves in the first stomach, the pendulums 91 turn around the rotary shaft 94, and the generator 92 generates a voltage. The charging circuit 93 rectifies the generated voltage and charges a secondary battery 81. The secondary battery 81 drives a controller 80. An antenna 2" is externally fitted to the casing 1. The antenna 2" may serve as a sensor.

In the apparatus 14 of the fifth embodiment of FIG. 7, the generator unit 90 is inserted into the space 1" of the annular casing 1'.

Figure 10:
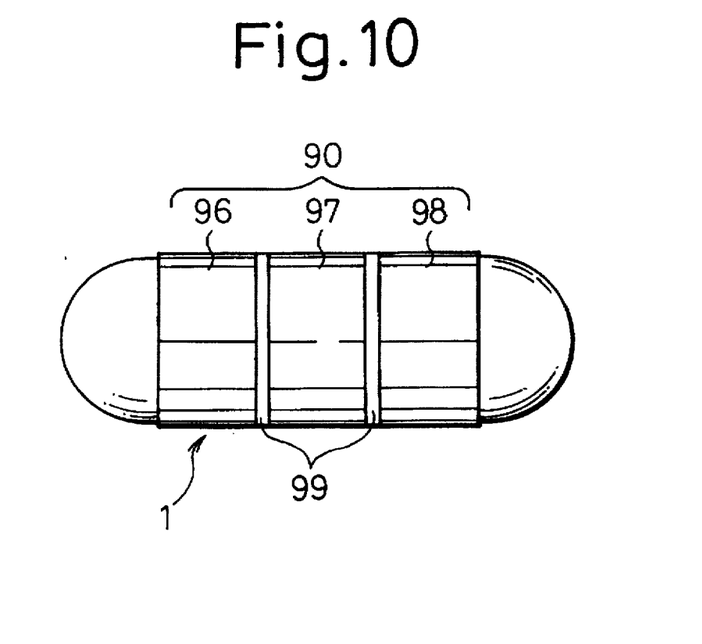
FIG. 10 is a side view showing an internal identification apparatus for animals having an external generator, according to a modification of the seventh embodiment of the present invention.

The generator unit 90 is not limited to a combination of the pendulums 91 and generator 92. For example, the generator unit may employ dissimilar metals exposed on the periphery of a casing 1 as shown in FIG. 10. A voltage is generated between the dissimilar metals, to charge a secondary battery 81. The dissimilar metals on the periphery of the casing 1 may be a zinc plate 96, an aluminum plate 97, and a brass plate 98. Insulation spacers 99 are disposed between the dissimilar metals. The dissimilar metals are not particularly limited. For example, they may be stainless steel and platinum. When the casing is removed, the dissimilar metals stop to generate power. This phenomenon is used as a mechanism for checking the extraction of the apparatus.

Figure 11A:
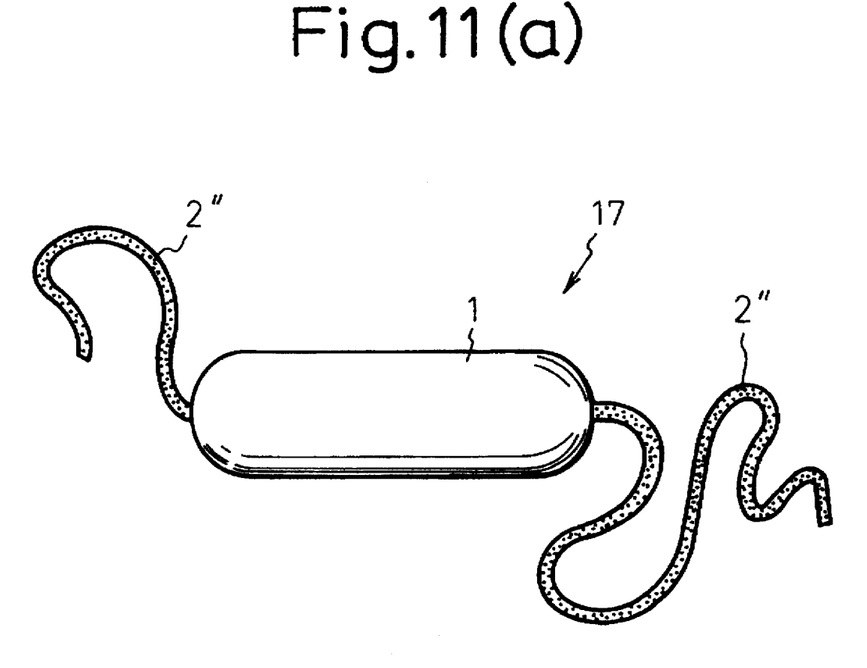
FIG. 11(a) is a side view showing an internal identification apparatus for animals having an external antenna, according to an eighth embodiment of the present invention.
Figure 11B:
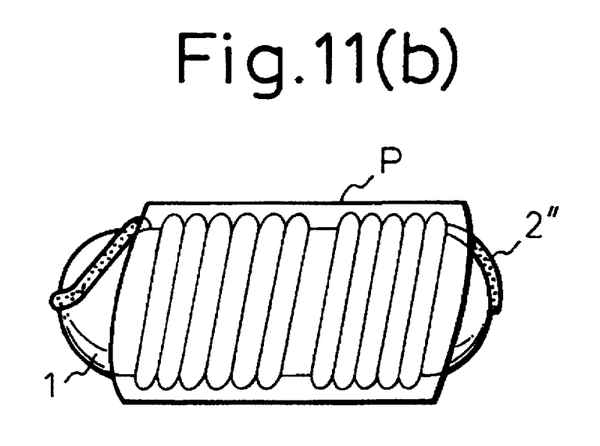
FIG. 11(b) is a side view showing the internal identification apparatus of FIG. 11(a) before being applied to an animal.

FIG. 11 shows an internal identification apparatus 17 according to the eighth embodiment of the present invention. Similar to the embodiment of FIG. 9, an antenna 2" is externally fitted to a casing 1. In FIG. 11(a), the antenna 2" is arranged at each end of the casing 1. Before the casing 1 is swallowed by a cow, the antenna 2" is wound around the casing 1 and fixed with a water-soluble sheet P as shown in FIG. 11(b).

Figure 12A:
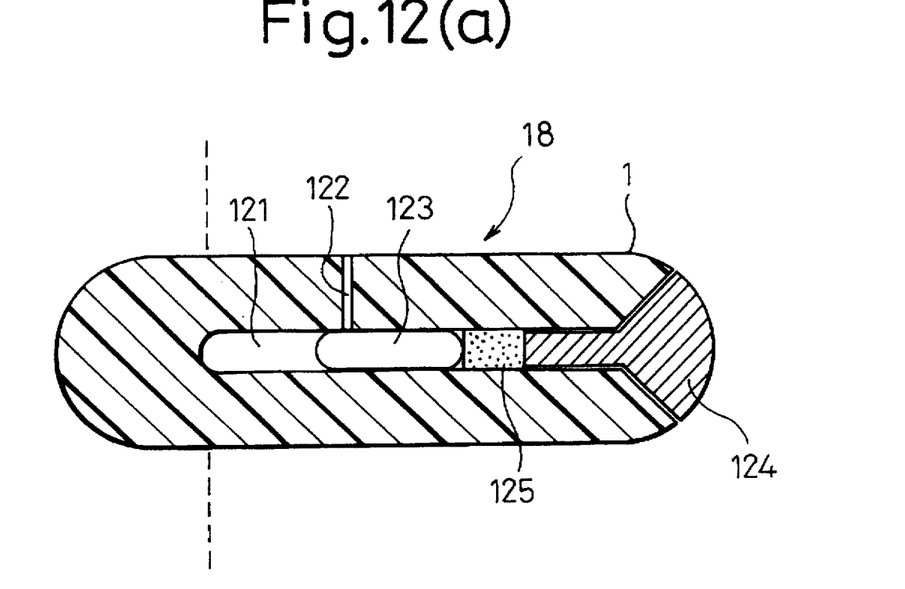
FIG. 12(a) is a partly broken side view showing an internal identification apparatus for animals employing a capsule having a reception chamber, according to a ninth embodiment of the present invention.

FIG. 12(a) shows an internal identification apparatus 18 according to the ninth embodiment of the present invention. A plastic casing 1 contains a reception chamber 121. An end of the reception chamber 121 is open to an end of the casing 1. An air path 122 is formed between the front end of the reception chamber 121 and the side face of the casing 1. Data regarding the blood, hair, nose patterns, body fluid, etc., characteristic to a cow that swallows the apparatus, and antiseptics, are inserted in the reception chamber 121 through the opening. A transponder 123 is inserted into the reception chamber 121. A cushioning material 125 is pushed into the reception chamber 121 with a pusher plug 124. At this time, air in the reception container 121 escapes through the air path 122. When the plug 124 is attached to the casing 1, the air path 122 is closed by the plug 124.

The casing 1 can be cut along a dotted line, to extract the evidence of the animal out of the reception chamber 121. The evidence is collated to determine if an illegal replacement has been done.

Figure 12B:
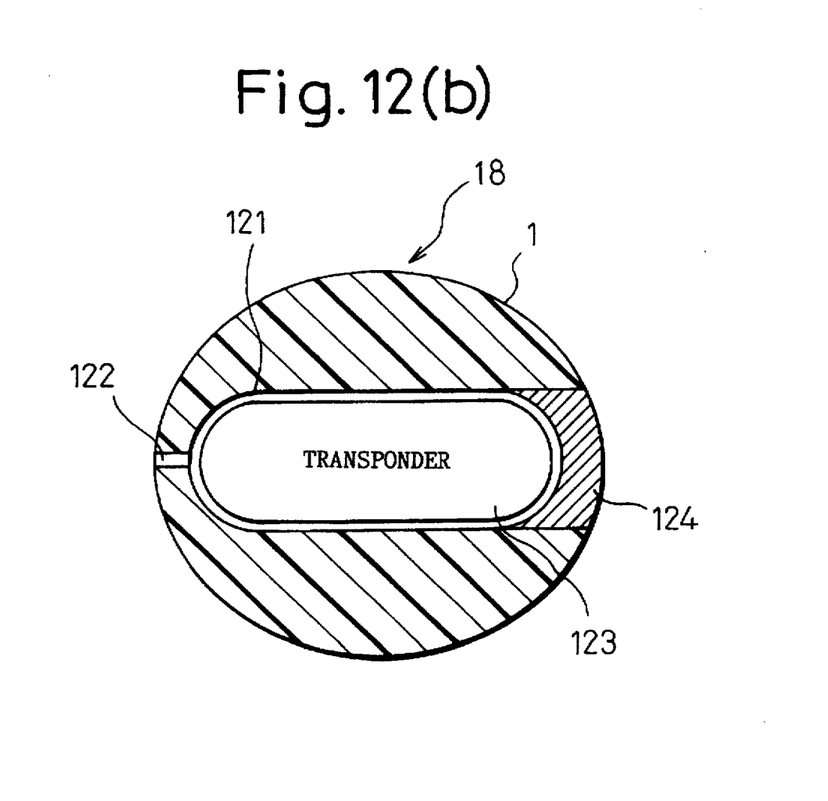
FIG. 12(b) shows a spherical casing having a reception chamber, according to a modification of the embodiment of FIG. 12(a)

The casing 1 of FIG. 12(a) has a capsule shape. The shape of the casing 1 is not particularly limited. For example, it may have a spherical shape having a circular or elliptic cross section, as shown in FIG. 12(b). In this figure, the same parts as those of FIG. 12(a) are represented with like reference marks, and their explanations are omitted.

Figure 13:
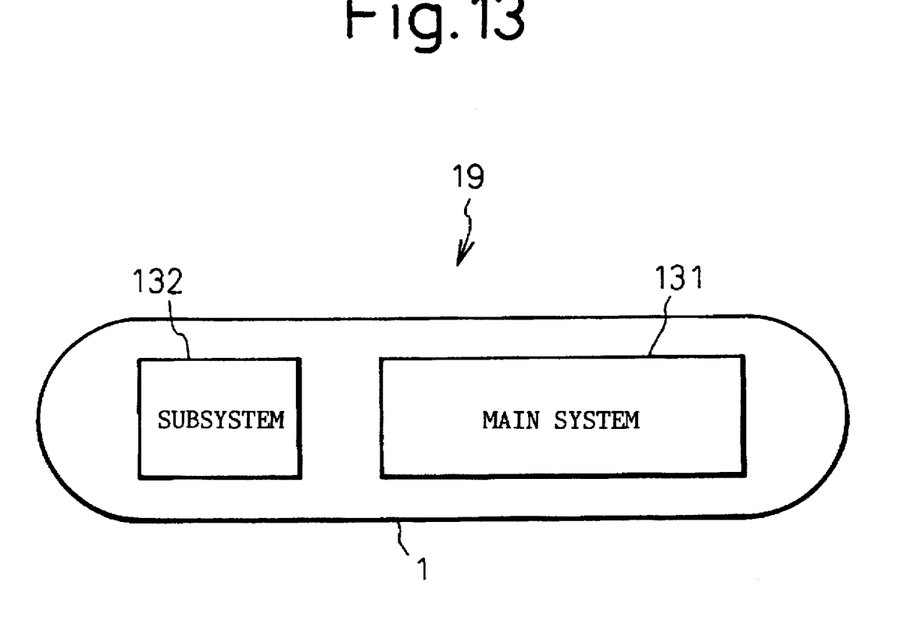
FIG. 13 shows an internal identification apparatus having a main system and a subsystem, according to a 10th embodiment of the present invention.

FIG. 13 shows an internal identification apparatus 19 according to the 10th embodiment of the present invention. A casing 1 incorporates a main identification system 131 and a subsidiary identification system 132. Namely, this embodiment employs dual detection systems for fail-safe operation. Even if one of the systems fails, the other may provide data. One of the systems may be designed to be not so durable but operable for a long communication distance and the other to be strong but operable only for a short communication distance. This arrangement is advantageous in practical use.

This arrangement is also advantageous when renewing the systems. One of the systems 131 and 132 is fabricated as a conventional system, and the other as a new system. Then, the apparatus is applicable to a user using a conventional detector, and the systems will be smoothly renewed.

Figure 14:
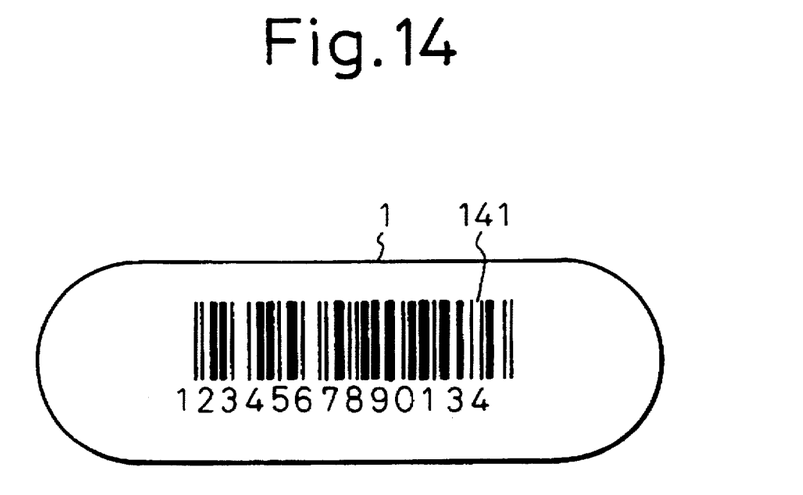
FIG. 14 is a side view showing an internal identification apparatus provided with identification codes on its casing, according to the present invention.

FIG. 14 shows an example applicable to any one of the internal identification apparatuses 10 to 19 of the first to 10th embodiments. An identifier 141 is arranged on the surface of a casing 1, so that the apparatus is identifiable by eye or by a reader (not shown). The identifier 141 may be bar codes as shown in the figure, or numerical or alphabetical marks. The identifier 141 on the casing 1 makes insertion work on site easier. A bar-code reader may be employed to shorten confirmation work and prevent errors in applying the apparatus to an animal.

The casing 1 of an internal identification apparatus may incorporate a positioning device for locating the position of the corresponding animal. The positioning device is activated once a month or in response to a predetermined action of the animal, to inform the location of the animal. This arrangement prevents a replacement of the apparatus and provides data related to a breeding place.

Although the above embodiments have been explained with reference to a cow, the present invention is applicable to any ruminant by changing the size and shape of the casing 1.

Figure 15:
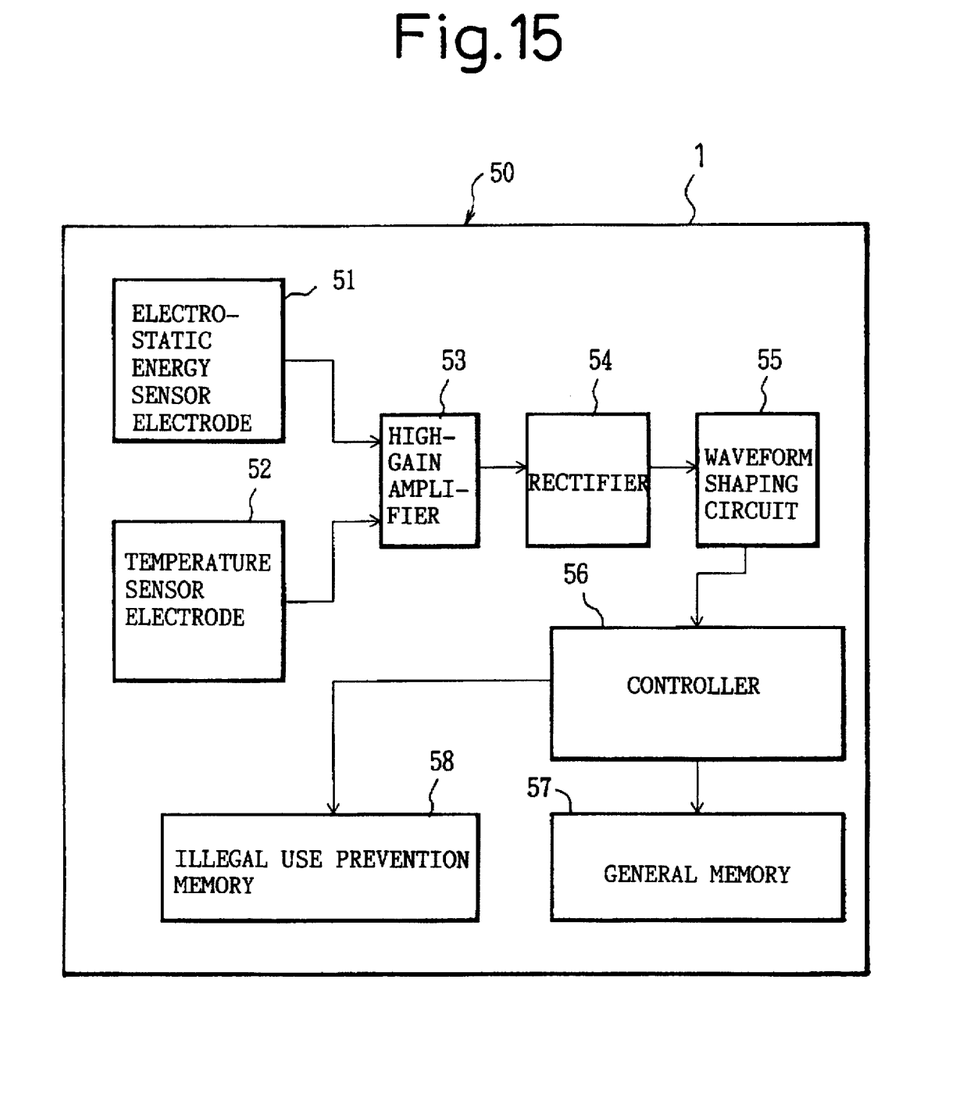
FIG. 15 is a block diagram showing an internal identification apparatus for animals according to an 11th embodiment of the present invention.

FIG. 15 shows an internal identification apparatus 50 according to the 11th embodiment of the present invention. The apparatus 50 is embedded in a part of a ruminant, or is swallowed by a ruminant and stays in the stomach thereof. The apparatus 50 has a casing 1 that incorporates an electrostatic energy sensor electrode 51, a temperature sensor electrode 52, a high-gain amplifier 53, a rectifier 54, a waveform shaping circuit 55, a controller 56, a general memory 57, and an illegal-use-prevention memory 58.

After the apparatus 50 is installed in a cow, it receives electrostatic energy due to environmental static electricity and electrostatic induction. If the apparatus 50 is taken out of the cow, the electrostatic energy greatly changes. When such a change occurs, the controller 56 detects it through the sensor electrodes 51 and 52 and stores the change in the memory 58. The data once stored in the memory 58 are not erasable so that an illegal extraction of the apparatus 50 out of the cow is detectable. This prevents an illegal replacement of the apparatus 50.

An external reader displays, instead of ID data, whether or not the apparatus has been illegally used.

To reduce power consumption, the outputs of the sensor electrodes may be supplied to a comparator, and only when the outputs are above the threshold of the comparator, the comparator may provide the high-gain amplifier 53 with an output signal. In response to this output signal, the illegality prevention circuits such as the high-gain amplifier 53, rectifier 54, waveform shaping circuit 55, and illegal-use-prevention memory 58 are energized.

The embodiment of FIG. 15 detects an environmental change according to changes in the outputs of the electrostatic energy sensor electrode 51 and temperature sensor electrode 52. Alternatively, photosensors, pH sensors, or conductance sensors are employable singularly or in combination to detect environmental changes.

Bimetal or shape-memory alloy is employable as a temperature sensor. This sensor changes itself in response to a signal from the controller, to memorize the change.

CAPABILITY OF EXPLOITATION IN INDUSTRY

As explained above, the internal identification apparatus according to the first aspect of the present invention stays in the first or second stomach of a ruminant and collects or transmits data. The apparatus safely and surely stays in the stomach without injuring the ruminant. It is almost impossible to illegally replace the apparatus. For individual farms, the apparatus is useful to automatically feed cattle and record data such as the weights of cattle. For a cattle market, the apparatus is useful to secure cattle prices and accumulate data related to, for example, the quality of meat. Since the apparatus stays in the first or second stomach of a ruminant, it is easily located and collected after the ruminant is slaughtered, and can be reused.

The internal identification apparatus according to the second aspect of the present invention memorizes an environmental change that will occur if the apparatus is taken out of the corresponding animal. This prevents an illegal use of the apparatus and improves the reliability thereof.

We claim:

1. An internal identification apparatus or animals, to be swallowed by a ruminant and stay in a first or second stomach of the ruminant, comprising:
   a casing made from material that is resistive to gastric juices in the first or second stomach, and having a proper weight and shape to stay in the first or second stomach;
   an antenna for transmitting and receiving data, internally or externally formed on the casing;
   data storage means and a controller incorporated in the casing, the controller transmitting data stored in the data storage means through the antenna in response to electromagnetic waves from outside the ruminant;
   power supply means incorporated in the casing, for driving the controller in response to the electromagnetic waves; and
   dissimilar metals exposed on the surface of the casing, for providing some signals or a voltage to charge the power supply means.

2. The internal identification apparatus for animals according to claim 1, wherein the antenna is a coil antenna that generates an electromotive force in response to the electromagnetic waves, to drive the controller.

3. The internal identification apparatus for animals according to any one of claims 1 or 2, further comprising a reception chamber defined in the casing, for sealing therein a characteristics of the ruminant that swallows the casing.

4. The internal identification apparatus for animals according to any one of claims 1 or 2, wherein the casing incorporates a part that usually operates and a part that operates under specific conditions.

5. The internal identification apparatus for animals according to any one of claims 1 or 2, further comprising an identifier externally arranged on the casing, to identify the apparatus visually or through a reader.

6. The internal identification apparatus for animals according to any one of claims 1 or 2, further comprising a positioning device incorporated in the casing, for locating the animal.

7. The internal identification apparatus for animals according to any one of claims 1 to 2, wherein characteristics of the animal are digitized, encoded, and stored in the data storage means before the apparatus is swallowed by, inserted in, or embedded in the animal.

8. An internal identification apparatus for animals, to be inserted or embedded in a part of an animal, having a casing that contains an antenna, data storage means, and control means for transmitting data stored in the data storage means through the antenna in response to electromagnetic waves externally provided,
   the control means storing, in the data storage means, an environmental change that occurs if the apparatus is taken out of the part of the animal.

9. An internal identification apparatus for animals, to be swallowed by a ruminant and stay in a first or second stomach of the ruminant, comprising:
   a casing made from material that is resistive to gastric juices in the first or second stomach, and having a proper weight and shape to stay in the first or second stomach;
   an antenna for transmitting and receiving data, internally or externally formed on the casing;
   data storage means and a controller incorporated in the casing, the controller transmitting data stored in the data storage means through the antenna in response to electromagnetic waves from outside the ruminant; and
   hairs or fins for surely keeping the casing in the first or second stomach.

10. An internal identification apparatus for animals, to be swallowed by a ruminant and stay in a first or second stomach of the ruminant, comprising:
    a casing made from material that is resistive to gastric juices in the first or second stomach, and having a proper weight and shape to stay in the first or second stomach;
    an antenna for transmitting and receiving data, internally or externally formed on the casing;
    data storage means and a controller incorporated in the casing, the controller transmitting data stored in the data storage means through the antenna in response to electromagnetic waves from outside the ruminant;
    sound means incorporated in the casing, to be driven by the controller in response to the electromagnetic waves, for generating a conditioned reflex in the ruminant; and
    hairs or fins for surely keeping the casing in the first or second stomach.

11. An internal identification apparatus for animals, to be swallowed by a ruminant and stay in a first or second stomach of the ruminant, comprising:
    a casing made from material that is resistive to gastric juices in the first or second stomach, and having a proper weight and shape to stay in the first or second stomach;

an antenna for transmitting and receiving data, internally or externally formed on the casing;

data storage means and a controller incorporated in the casing, the controller transmitting data stored in the data storage means through the antenna in response to electromagnetic waves from outside the ruminant; and wherein the controller or another circuit in the casing stores, in the data storage means, an environmental change that occurs when the apparatus is taken out of the animal.

* * * * *